US012789978B1

(12) United States Patent
Daneshvaran et al.

(10) Patent No.: US 12,789,978 B1
(45) Date of Patent: Nov. 10, 2026

(54) AIRCRAFT WING CONFIGURED TO REDUCE AERODYNAMIC NOISE GENERATED BY LEADING-EDGE SLATS DURING HIGH-LIFT OPERATIONS

(71) Applicant: The Boeing Company, Arlington, VA (US)

(72) Inventors: Navid Daneshvaran, Everett, WA (US); Takao Suzuki, Mill Creek, WA (US); Kim Marie Larson, Olalla, WA (US); Jeffrey Peter Baucum, Sequim, WA (US)

(73) Assignee: THE BOEING COMPANY, Arlington, VA (US)

(*) Notice: Subject to any disclaimer, the term of this patent is extended or adjusted under 35 U.S.C. 154(b) by 0 days.

(21) Appl. No.: 19/423,291

(22) Filed: Dec. 17, 2025

(51) Int. Cl.
*B64C 9/24* (2006.01)
*B64C 9/02* (2006.01)

(52) U.S. Cl.
CPC .................. *B64C 9/24* (2013.01); *B64C 9/02* (2013.01); *B64C 2230/14* (2013.01)

(58) Field of Classification Search
CPC .... B64C 9/24; B64C 9/22; B64C 9/02; B64C 2230/14
See application file for complete search history.

(56) References Cited

U.S. PATENT DOCUMENTS 10,272,987 B2 * 4/2019 Turner ...................... B64C 9/22
2021/0237850 A1 * 8/2021 Turner ...................... B64C 9/24

FOREIGN PATENT DOCUMENTS

EP 3676173 B1 * 3/2022 .............. B64C 3/28

* cited by examiner

*Primary Examiner* — Valentina Xavier
(74) *Attorney, Agent, or Firm* — MH2 Technology Law Group LLP

(57) ABSTRACT

An aircraft wing assembly configured to reduce aerodynamic noise generated by leading-edge slats during high-lift operations. The assembly may include a fixed wing portion, a leading-edge slat having a noise-suppressing projection on a cove surface, a projection receiving portion configured to receive the noise-suppressing projection when the leading-edge slat is in a retracted position, and a surface portion configured to move between a first position in which the surface portion at least partially defines the projection receiving portion and a second position in which the surface portion moves to provide a convex or planar surface in place of the projection receiving portion. The surface portion may be configured to move to the first position when the leading-edge slat is in a retracted position and is configured to move to the second position when the leading-edge slat is in an extended position.

20 Claims, 4 Drawing Sheets

AIRCRAFT WING CONFIGURED TO REDUCE AERODYNAMIC NOISE GENERATED BY LEADING-EDGE SLATS DURING HIGH-LIFT OPERATIONS

FIELD

The present disclosure relates generally to aerodynamic configurations for aircraft wings and, more particularly, to surface features configured to allow for reduced aerodynamic noise generated by leading-edge slats during high-lift operations.

BACKGROUND

Modern transport aircraft commonly employ multi-element high-lift systems consisting of leading-edge slats and trailing-edge flaps to increase lift during takeoff and landing. When deployed, the slat forms a slot with the wing's fixed element, allowing high-energy airflow to be directed over the upper surface of the wing. While effective for lift enhancement, the airflow also generates significant airframe noise when the slat is deployed, especially during landing conditions where engine power is reduced.

One major source of slat-related noise arises from unsteady airflow within the slat cove region. As airflow enters the slot, it can separate, recirculate, and reattach in a highly turbulent manner. These flow structures interact with the edges of the slat and the wing to produce broadband noise and tonal components that radiate outward and are detectable on the ground. Numerous studies have shown that the inner cavity of the slat, particularly the cove area and associated geometries, can act as an acoustic resonator or promote vortex shedding, thereby generating additional noise.

Conventional approaches for reducing slat noise have included modifying slat geometry, adding porous or flexible surfaces, employing slat cove fillers, or altering slat deployment trajectories. While these solutions may offer partial noise reduction, they often introduce trade-offs in weight, mechanical complexity, aerodynamic performance, manufacturing cost, and/or maintainability.

There remains a need for improved leading-edge slat/wing configurations capable of reducing aerodynamic noise generated when the slat is deployed without negatively affecting lift performance, structural integrity, slat deployment kinematics, and aerodynamic performance when the leading-edge slat is retracted. Accordingly, it may be desirable to provide a passive, shape-based solution located on the inner surface of the leading-edge slat configured to modify internal flow behavior and a corresponding configuration of the fixed wing element that allows the leading-edge slat to be properly positioned when retracted.

SUMMARY

According to various implementations, an aircraft wing may be configured to reduce aerodynamic noise generated by the deployment of leading-edge slats during high lift operations. In some embodiments, the leading-edge slat may include a fixed noise-suppressing projection.

In some embodiments, a projection receiving arrangement for an aircraft wing may include a projection receiving portion located in an upper side of a leading-edge portion of the aircraft wing. The projection receiving portion may be configured to receive a noise-suppressing projection positioned on a cove surface of a leading-edge slat of the aircraft wing when the leading-edge slat is in a retracted position.

In some embodiments, the projection receiving arrangement may include a surface portion that is configured to move between a first position in which the surface portion at least partially defines the projection receiving portion and a second position in which the surface portion moves to provide a convex or planar surface in place of the projection receiving portion.

In some embodiments, the surface portion may be configured to move to the first position when the leading-edge slat is in a retracted position and may be configured to move to the second position when the leading-edge slat is in an extended position.

In some embodiments, the surface portion may be configured to pivot between the first position and the second position.

In some embodiments, the projection receiving arrangement may include a hinge portion configured to pivotally attach the surface portion to the leading-edge portion aft of the projection receiving portion.

In some embodiments, the projection receiving arrangement may include a biasing portion configured to bias the surface portion to the second position.

In some embodiments, a shape-memory material, associated with the surface portion, may be trained to move the surface portion from the first position to the second position in response to being heated above a transition temperature. In some embodiments, the surface portion may include the shape-memory material.

In some embodiments, the surface portion may be configured to morph from a concave shape in the first position to the convex or planar surface in the second position.

In some embodiments, the noise-suppressing projection may be a fixed hump.

In some embodiments, the surface portion may be configured to be moved to the first position by the noise-suppressing projection when the leading-edge slat is moved to the retracted position.

In some embodiments, an aircraft wing assembly may include a fixed wing portion and a leading-edge slat attached to the fixed wing portion. The leading-edge slat may be configured to move between a retracted position and an extended position. In some embodiments, the leading-edge slat may include a noise-suppressing projection on a cove surface.

In some embodiments, the aircraft wing assembly may include a projection receiving portion located in an upper side of a leading-edge portion of the fixed wing portion. In some embodiments, the projection receiving portion may be configured to receive the noise-suppressing projection when the leading-edge slat is in a retracted position.

In some embodiments, the aircraft wing assembly may include a surface portion configured to move between a first position in which the surface portion at least partially defines the projection receiving portion and a second position in which the surface portion moves to provide a convex or planar surface in place of the projection receiving portion.

In some embodiments, the surface portion may be configured to move to the first position when the leading-edge slat is in a retracted position and is configured to move to the second position when the leading-edge slat is in an extended position.

In some embodiments, the surface portion may be configured to pivot between the first position and the second position.

In some embodiments, the aircraft wing assembly may include a hinge portion configured to pivotally attach the surface portion to the leading-edge portion aft of the projection receiving portion, and a biasing portion configured to bias the surface portion to the second position.

In some embodiments, a shape-memory alloy, associated with the surface portion, may be trained to move the surface portion from the first position to the second position in response to being heated above a transition temperature.

In some embodiments, the surface portion may be configured to morph from a concave shape in the first position to the convex or planar surface in the second position.

In some embodiments, the noise-suppressing projection may be a fixed hump.

In some embodiments, the surface portion may be configured to be moved to the first position by the noise-suppressing projection when the leading-edge slat is moved to the retracted position.

In some embodiments, a method for implementing an aircraft wing configured to reduce aerodynamic noise generated by leading-edge slats during high-lift operations may include providing a fixed, noise-suppressing projection on a cove surface of a leading-edge slat of an aircraft wing. The noise-suppressing projection may be configured to reduce noise associated with airflow when the leading-edge slat is in an extended position.

In some embodiments, the method may include receiving the fixed, noise-suppressing projection in a projection-receiving portion on an upper side of the aircraft wing when the leading-edge slat is in a retracted position.

In some embodiments, the method may include moving the surface portion to a second position to provide a convex or planar surface in place of the projection receiving portion in response to the leading-edge slat moving to the extended position.

In some embodiments, receiving the fixed, noise-suppressing projection in the projection receiving portion includes engaging the surface portion with the noise-suppressing projection to move the surface portion to the first position.

In some embodiments, the surface portion may be configured to pivot inward relative to an upper surface of a leading-edge portion of the aircraft wing to move to the first position.

In some embodiments, the method include biasing the surface portion to the second position.

In some embodiments, the surface portion may include a shape-memory alloy trained to expand from the second position, and moving the surface portion to the second position comprises heating the surface portion above a transition temperature.

Combinations, (including multiple dependent combinations) of the above-described elements and those within the specification have been contemplated by the inventors and may be made, except where otherwise indicated or where contradictory.

BRIEF DESCRIPTION OF THE DRAWINGS

Various features of the examples can be more fully appreciated, as the same become better understood with reference to the following detailed description of the examples when considered in connection with the accompanying figures, in which.

DETAILED DESCRIPTION

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary examples in which the invention may be practiced. These examples are described in sufficient detail to enable those skilled in the art to practice the invention and it is to be understood that other examples may be utilized and that changes may be made without departing from the scope of the invention. The following description is, therefore, merely exemplary.

Figure 1:
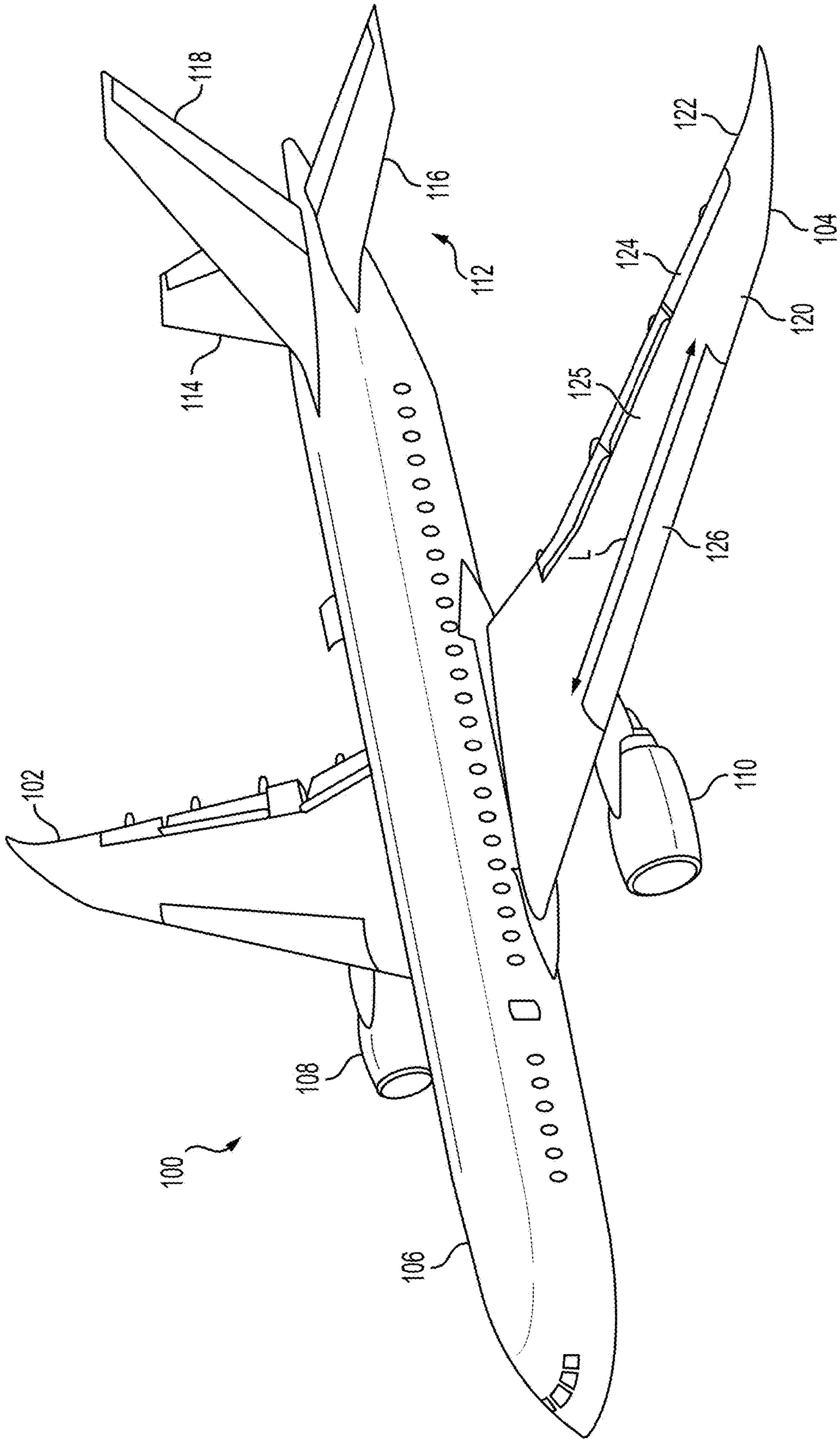
FIG. 1 is a perspective view of an aircraft configured with an example leading-edge slat according to the present application.

FIG. 1 illustrates an example aircraft 100 having a first wing 102 and a second wing 104 extending from a fuselage 106. The aircraft 100 may include a first engine 108 attached to the first wing 102 and a second engine 110 attached to the second wing 104. The fuselage 106 may include a tail section 112 having a first horizontal stabilizer 114, a second horizontal stabilizer 116 opposite the first horizontal stabilizer 114, and a vertical stabilizer 118. Each wing 102, 104 may include a leading-edge portion 120 and a trailing edge portion 122. Each wing 102, 104 may include an aileron 124 as part of the trailing edge portion 122 that is configured to pivot relative to a fixed portion 125 of the wings 102, 104 for adjusting roll of the aircraft 100. Each wing 102, 104 may include a leading-edge slat 126 as part of the leading-edge portion 120 that is configured to move forward (i.e., outward) and downward relative to the fixed portion 125 of the wings 102, 104 to an extended position to increase lift during low-speed flight, such as during takeoff and landing. The leading-edge slat 126 may extend along the leading-edge portion 120 a length L.

Figure 2:
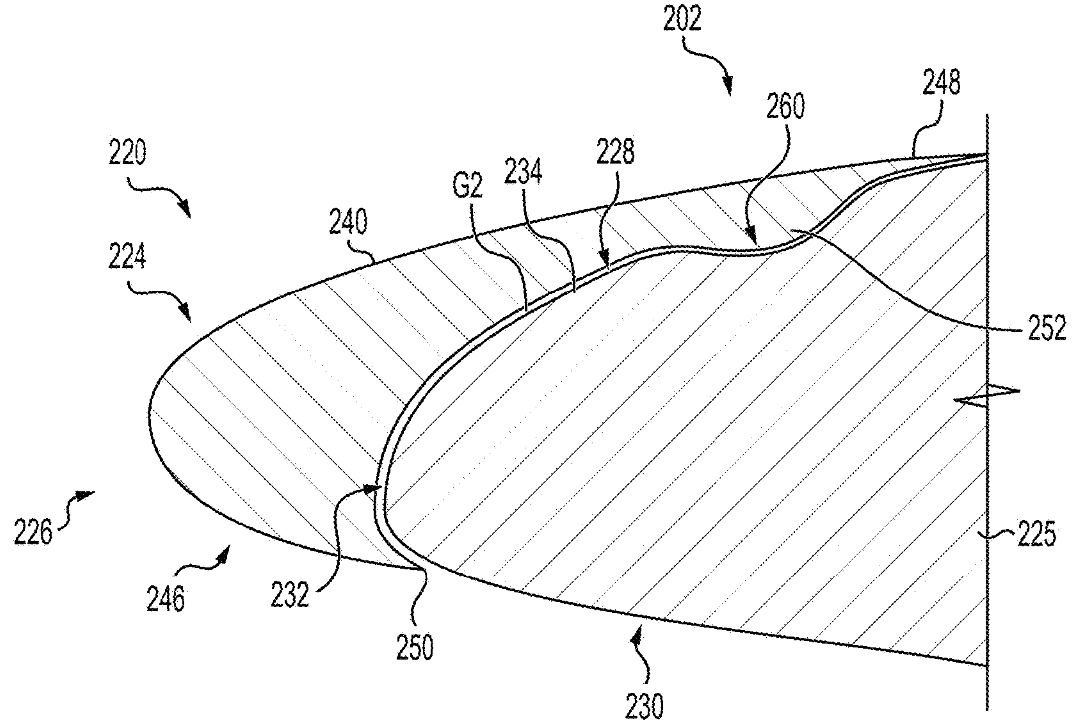
FIG. 2 is an enlarged simplified representation of a leading-edge portion of a wing of the aircraft of FIG. 1 showing the example leading edge slat in a retracted position.
Figure 3:
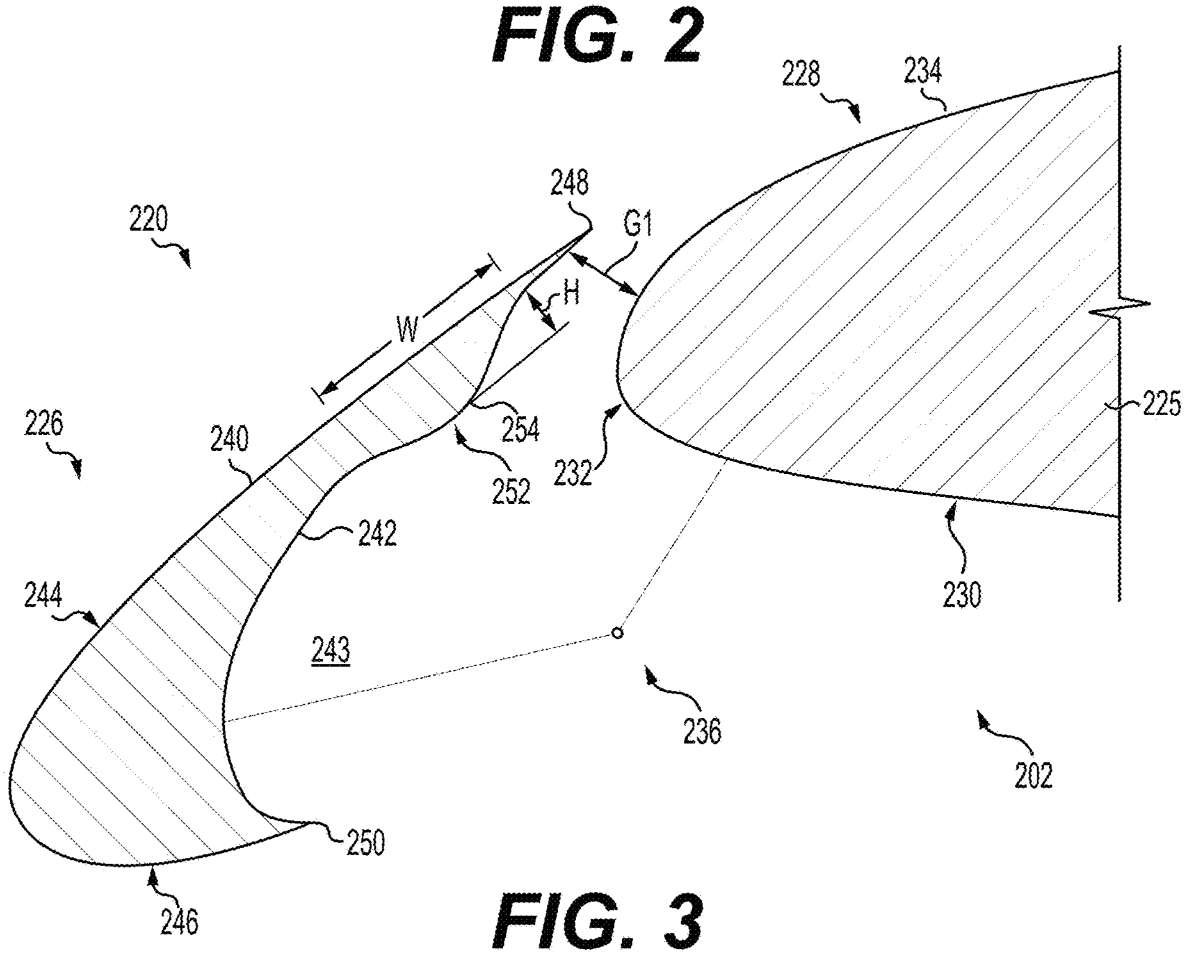
FIG. 3 is an enlarged simplified representation of the leading-edge portion of FIG. 2 showing the example leading edge slat in an extended position.
Figure 4:
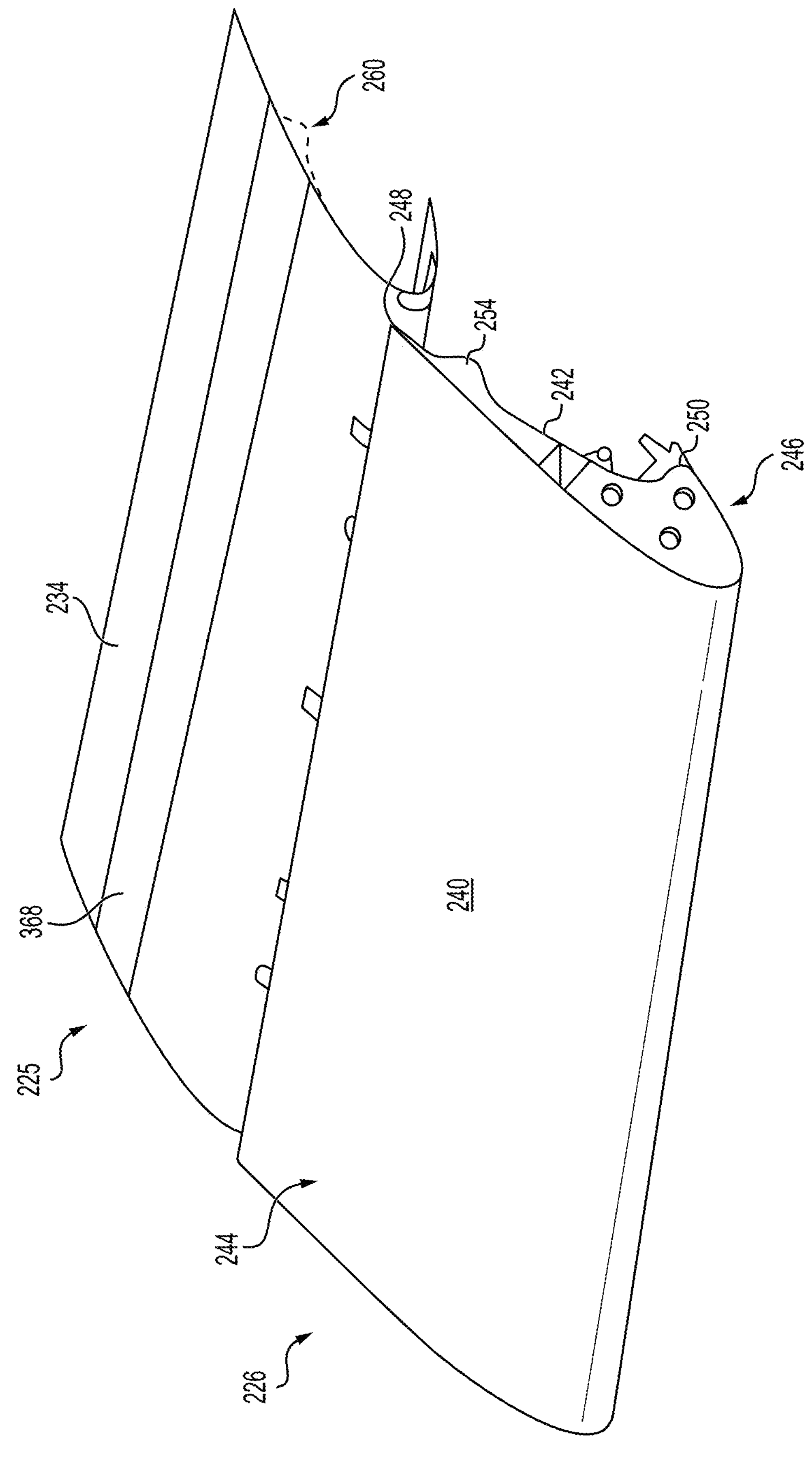
FIG. 4 is a perspective view of the leading-edge portion of FIG. 2 showing the example leading edge slat in the second position.

FIGS. 2-3 show simplified representations of an example leading-edge portion 220 of a wing 202 of an aircraft (e.g., the aircraft 100 of FIG. 1) showing an example leading-edge slat 226 in a retracted position and in an extended position, respectively. The leading-edge portion 220 may include a fixed portion 225 having an upper side 228, a lower side 230 opposite the upper side 228, and a nose portion 232 extending between the upper side 228 and the lower side 230. The fixed portion 225 may include an outer surface portion 234 defining a fixed leading edge outer mold line (OML).

The leading-edge portion 220 may include a slate actuation assembly or system 236 (e.g., links, arms, shafts, tracks, rollers, brackets, actuators, etc.) configured to move the leading-edge slat 226 between the extended and retracted positions. In some embodiments, the slate actuation system 236 may be actuated electronically or hydraulically. In some embodiments, the slate actuation system 236 may be in a conventional configuration. In other embodiments, however, the slate actuation system 236 may be a modified configuration which may be configured in a variety of ways. For example, as will be discussed below, the volume inside the fixed portion 225 of the leading-edge portion 220 may be used to receive or store certain portions (e.g., surface features) of the disclosed embodiments. Thus, depending on, for example, how much volume is available inside the fixed portion 225, the arrangement and type of devices used in the slate actuation system 236 may vary. For example, in some embodiments, a linear hydraulic actuator may be replaced with rotary actuator, or an auxiliary arm may not be needed in some designs. Thus, the arrangement of devices and the types of devices used in the slate actuation system 236 may vary in different embodiments (e.g., so as to meet take-off/cruise/landing requirements).

The leading-edge slat 226 may include a convex outer surface portion 240 and an inner surface portion or cove surface portion 242 opposite outer surface portion 240. The inner surface portion 242 may form a slat cove region 243 having a concave shape. The mechanical assembly 236 may be configured to attach to the inner surface portion of the leading-edge slat 226. The outer surface portion 240 may define an upper side or suction side 244 and a lower side or pressure side 246. The intersection of the upper side 244 of the outer surface portion 240 and the inner surface portion 242 may define an upper side or suction side trailing edge 248. The intersection of the lower side 246 of the outer surface portion 240 and the inner surface portion 242 may define a lower side or pressure side trailing edge 250.

In the extended position, a gap or slot G1 is formed between the leading-edge slat 226 and the fixed portion 225 (e.g., between the top side trailing edge 248 and the outer surface portion 234). In a conventional leading-edge slat configuration, there are two major mechanisms that generate leading-edge noise from airflow when a leading-edge slat is deployed. High-frequency noise may result from (i) shear layer instability at the upper side or suction side trailing edge, (ii) airflow passage through the gap between the leading-edge slat and the fixed portion of the wing and (iii) airflow interacting with the mechanical linkage. Low-mid frequency noise may result from (i) airflow circulation around the slat cover region, (ii) shear layer instability from the slat leading-edge cusp (pressure side), and (iii) airflow interacting with the mechanical linkage.

Embodiments of the disclosed leading-edge slat 226 may include a noise-suppressing projection 252 located on the concave inner surface portion 242. The noise-suppressing projection 252 may be configured to, for example, interrupt the airflow circulation around the slat cover region and alleviate the shear layer reattachment, both of which contribute to aerodynamic noise generated when the leading-edge slat 226 is deployed.

In some embodiments, the noise-suppressing projection 252 may be fixed and permanent. In some embodiments, the noise-suppressing projection 252 may include a hump or rounded protuberance 254 (e.g., shaped like a bell curve). In some embodiments, the noise-suppressing projection 252 may be positioned adjacent or proximate the upper side trailing edge 248 along the concave inner surface portion 242. In some embodiments, the noise-suppressing projection 252 may have a height H and a width W. The noise-suppressing projection 252 may extend along a length of the leading-edge slat 226. For example, in some embodiments, the noise-suppressing projection 252 may extend along a majority of the length of the leading-edge slat 226, such as over 50% of the length, over 75% of the length, or over 90% of the length. The noise-suppressing projection 252 may be continuous or may be discontinuous. For example, to accommodate various structural elements associated with the leading-edge slat 226, such as the mechanical assembly 236.

As shown in FIG. 2, in the retracted position, the outer surface portion 240 on the upper side 244 of the leading-edge slat 226 may transition smoothly to the outer surface portion 234 on the upper side 228 of the fixed portion 225 (e.g., the outer surface portion 240 is flush, or nearly flush, with the outer surface portion 234). Further, there may be minimal space or a gap G2 between the outer surface portion 234 on the upper side 228 of the fixed portion 225 and the inner surface portion 242 of the leading-edge slat 226. The preferred height H of the noise-suppressing projection 252, however, is greater than the typical space or gap G2. Thus, in order to implement the fixed noise-suppressing projection 252 and allow for the leading-edge slat 226 to be moved to the retracted position, a projection receiving arrangement 260 may be provided on the fixed portion 225.

The projection receiving arrangement 260 may be configured to receive the noise-suppressing projection 252 when the leading-edge slat 226 is in the retracted position such that the upper side 244 of the leading-edge slat 226 transitions smoothly to the outer surface portion 234 on the upper side 228 of the fixed portion 225.

Figure 5:
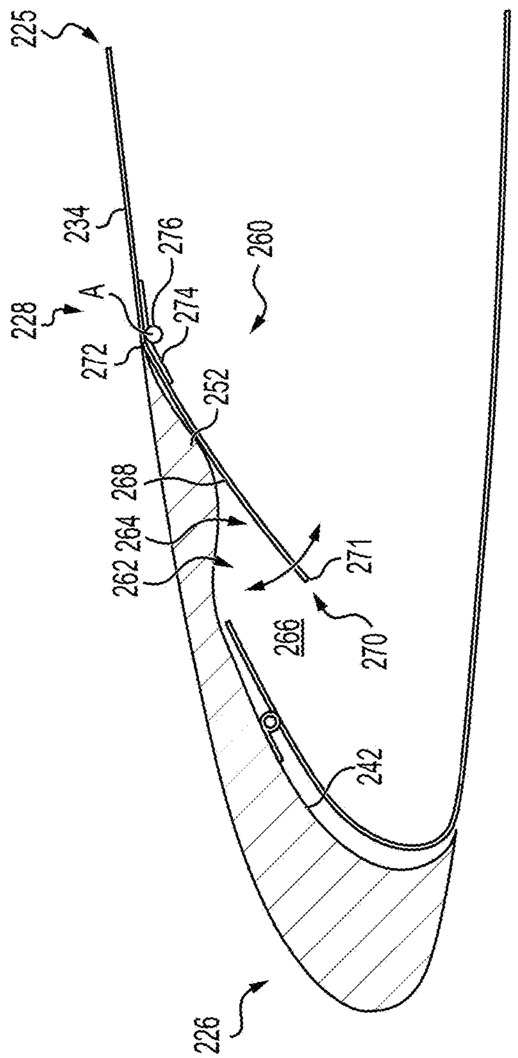
FIG. 5 is an enlarged simplified representation of the leading-edge portion of FIG. 2 showing the example leading edge slat in the first position and an example projection receiving portion of the wing.

The projection receiving arrangement 260 may be configured in a variety of ways. FIG. 5 illustrates an example embodiment of the projection receiving arrangement 260. In some embodiments, the projection receiving arrangement 260 may include projection receiving portion 262 (e.g., an open space, a recessed portion, etc.) in the outer surface portion 234 on the upper side 228 of the fixed portion 225 that is configured to receive the noise-suppressing projection 252 when the leading-edge slat 226 is in the retracted position. The projection receiving portion 262 may extend along a length of the upper side 228 of the fixed portion 225 parallel with the fixed, noise-suppressing projection 252 on the inner surface portion 242. The projection receiving portion 262 may be dimensioned to receive the noise-suppressing projection 252; thus, the projection receiving portion 262 may have a width, a depth, and a length equal to or greater than the width, height, and length, respectively, of the noise-suppressing projection 252. In some embodiments, the projection receiving portion 262 may include an opening in the outer surface portion 234 on the upper side 228 of the fixed portion 225 that opens to an inner volume 266 of the fixed wing portion 225.

The projection receiving arrangement 260 may also be configured to provide a convex or planar, smooth outer surface 268 at the upper side 228 of the fixed portion 225 that is consistent or flush with the fixed leading edge outer mold line (OML) of the fixed portion 225 when the leading-edge slate 222 is in the extended position. The restoration of the convex or planar, smooth outer surface 268 may be achieved in a variety of ways, such as for example, using a shape memory material (e.g. a shape memory alloy), one or more spring loaded surfaces, a sliding mechanism, an inflatable pneumatic boot, etc. In some embodiments, the projection receiving arrangement 260 may include a surface portion 264 that is configured to move between a first position in which the surface portion 264 at least partially defines the projection receiving portion 262 or is removed from the projection receiving portion 262 and a second position in which the surface portion 264 provides the convex or planar outer surface 268 portion. In some embodiments, the surface portion 264 is configured to move to the first position when the leading-edge slat 226 is in a retracted position and is configured to move to the second position when the leading-edge slat 226 is in an extended position.

The surface portion 264 may be configured in a variety of ways. In the example of FIG. 5, the surface portion 264 may be configured as a section of the upper side 228 of the fixed portion 225 (e.g., a section of the skin of the wing, a panel, a sheet, a flap, etc.). The surface portion 264 may have a leading edge 270, a trailing edge 272 opposite the leading edge 270, and the outer surface 268 extending between the leading edge 270 and the trailing edge 272. In some embodiments, the surface portion 264 may extend along the length of the upper side 228 of the fixed portion 225 the same length or greater length as the projection receiving portion 262. In some embodiments, the leading edge 270 may be configured to form a seal (e.g., weatherproof seal) with the upper side 228 of the fixed portion 225 when the leading-edge slat 222 is in the extended position. For example, in some embodiments, the leading edge 270 may a sealing portion 271, such as for example, an aerospace blade seal or other suitable seal arrangement.

The surface portion 264 may move between the first position and the second position in a variety of ways. For example, in some embodiments, the surface portion 264 may be configured to pivot between the first position and the second position. In some embodiments, the surface portion 264 may be configured to translate or slide between the first position and the second position. In some embodiments, the fixed portion 225 is configured to store the surface portion 264 (e.g., in the inner volume 266) when the leading edge slat 226 is in the retracted position In the illustrated embodiment, the projection receiving arrangement 260 may include a hinge portion 274 configured to pivotally attach the surface portion 264 to the leading-edge portion 220. The hinge portion 274 may be configured in any suitable manner. In some embodiments, the surface portion 264 may be biased to the second position. In some embodiments, the projection receiving arrangement 260 may include a biasing portion 276 (e.g., a torsion spring) configured to bias the surface portion 264 to the second position. In some embodiments, the biasing portion 276 may be incorporated in the hinge portion 274 (e.g., a spring-loaded hinge).

In some embodiments, the surface portion 264 may pivot about a pivot axis A positioned aft of the projection receiving portion 262. In some embodiments, the pivot axis may be position forward of the projection receiving portion 262. In some embodiments, the surface portion 264 may include multiple sections. For example, in some embodiments, the surface portion 264 may be discontinuous along a length of the leading-edge portion 220. In some embodiments, the surface portion 264 may have a forward section pivotably mounted forward of the projection receiving portion 262 and an aft section pivotably mounted aft of the projection receiving portion 262 (e.g., a double door style configuration).

In some embodiments, in operation, when the leading-edge slat 226 is moved to the retracted position, the noise-suppressing projection 254 engages the surface portion 264 to move the surface portion 264 from the first position to the second position and allow the noise-suppressing projection 254 to be received in the projection receiving portion 262.

Figure 6:
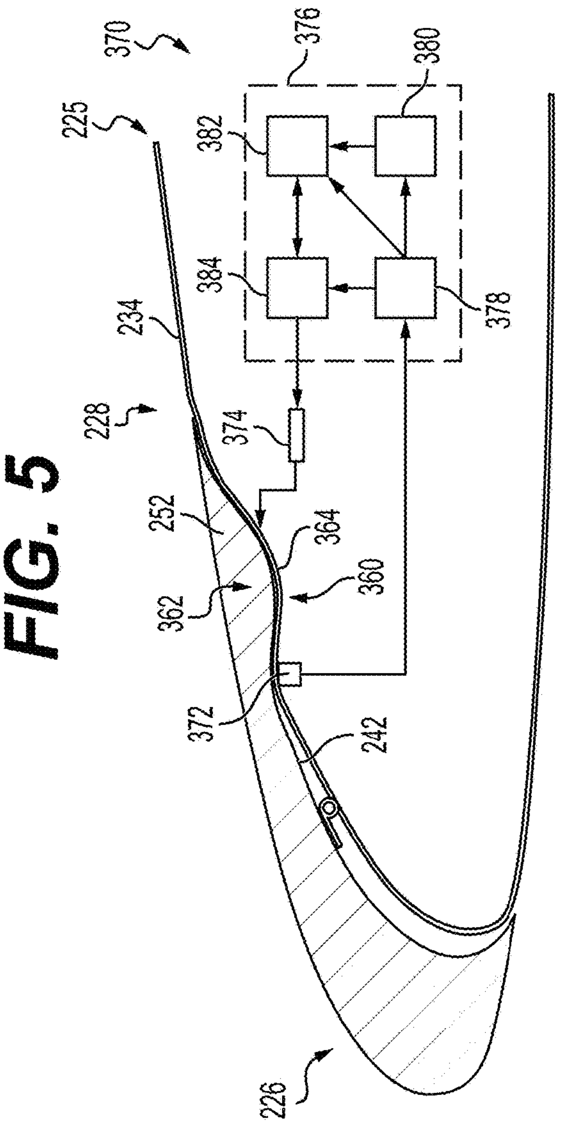
FIG. 6 is an enlarged simplified representation of the leading-edge portion of FIG. 2 showing the example leading edge slat in the first position and another example projection receiving portion of the wing.

FIG. 6 illustrates an example embodiment of a projection receiving arrangement 360. Reference numbers of like elements from the embodiment of FIG. 5 are used in the embodiment of FIG. 6 and the description applies equally to the embodiment of FIG. 6.

In some embodiments, the projection receiving arrangement 360 may include projection receiving portion 362 (e.g., an open space, a recessed portion, etc.) in the outer surface portion 234 on the upper side 228 of the fixed portion 225 that is configured to receive the noise-suppressing projection 252 when the leading-edge slat 226 is in the retracted position. The projection receiving portion 362 may extend along a length of the upper side 228 of the fixed portion 225 parallel with the fixed, noise-suppressing projection 252 on the inner surface portion 242. The projection receiving portion 362 may be dimensioned to receive the noise-suppressing projection 252.

The projection receiving arrangement 360 may also be configured to provide a convex or planar, smooth outer surface 368 at the upper side 228 of the fixed portion 225 that is consistent or flush with the fixed leading edge outer mold line (OML) of the fixed portion 225 when the leading-edge slate 222 is in the extended position. In some embodiments, the projection receiving arrangement 360 may include a surface portion 364 that is configured to move between a first position in which the surface portion 364 at least partially defines the projection receiving portion 362 and a second position in which the surface portion 364 provides the convex or planar outer surface 368 portion. In some embodiments, the surface portion 364 is configured to move to the first position when the leading-edge slat 226 is in a retracted position and is configured to move to the second position when the leading-edge slat 226 is in an extended position.

In the example of FIG. 6, the surface portion 364 may be configured as a section of the upper side 228 of the fixed portion 225 (e.g., a section of the skin of the wing, a panel, a sheet, a flap, etc.) that to morph or deform between a concave portion in the first position and a planar or convex portion in the second position. In the first position, the surface portion 364 may have a concave shape that defines the projection receiving portion 362 (e.g., volume defined by the concave surface) that the noise-suppressing projection 252 may be received in.

In some embodiments, a shape-memory material (e.g., a shape memory alloy) may be associated with the surface portion 364 (e.g., the surface portion 364 may include the shape memory material). In some embodiments, the shape memory material may be trained to move (i.e., morph, expand, etc.) from the concave shape in the first position to the planar or convex shape in the second position in response to being heated above a transition temperature. The shape memory material may be trained to move to the second position by any suitable method known in the art for training shape memory materials. Any suitable shape memory material may be used, such as, for example, a nickel-titanium (NiTi) alloy (i.e., Nitinol), a nickel-titanium-palladium (NiTiPd) alloy, a nickel-titanium-platinum (NiTiPt) alloy, or other suitable shape memory alloys.

The shape-memory material may be heated above the transition temperature in any suitable way, such as for example, running an electric current through the shape memory material or providing a heating element in proximity to the shape memory material. FIG. 6 provides a schematic of an example shape-memory material actuation system 370 for moving the surface portion 364 between the first and second positions. In some embodiments, the system 370 may include one or more sensors 372, a heat source 374, and a control system 376 configured to receive one or more input signals from the one or more sensors 372 and provide one or more output control signals to control (e.g., activate/deactivate) the heat source 374.

The one or more sensors 372 may be configured in a variety of ways. The one or more sensors 372 may be configured to provide information representative of a condition or state associated the projection receiving arrangement 360. Any suitable sensor(s) may be used. For example, in some embodiments, one or more sensors 372 may be configured to detect and output information representative of the position of the surface portion 364. For example, one or more of a surface portion position sensors may be configured to provide a signal indicative of the position (e.g., the first position, the second position) of the surface portion 364. In addition, one or more sensor 372 may be configured to detect and output information representative of one or more temperatures associated with the projection receiving arrangement 360. For example, in some embodiments, a shape-memory material temperature sensor may be configured to provide a signal indicative of the temperature of the shape-memory material, and a base temperature sensor may be configured to provide a signal indicative of a base temperature (e.g., of the fixed wing portion, of a position proximate the surface portion, etc.).

The heat source 374 may be configured in a variety of ways. Any heat source 374 suitable for heating the shape memory material associated with the surface portion that is capable of heating the shape memory material to at least the transition temperature of the material such that the shape memory material moves to the second position may be used. In some embodiments, the heat source 374 may be an electric heater (e.g., a cartridge heater).

The control system 376 may be configured in a variety of ways. For example, the control system 376 may include various subsystems and components configured to control the heat source 374 to selectively heat the shape-memory material. In some embodiments, the control system 376 may be in communication with, may be a subsystem of, or may be integrated within, a system the controls the leading-edge slat 226 during take-off, cruising, and landing.

In some embodiments, the control system 376 may include a data acquisition system 378 configured to receive signals from one or more sensors. The control system 376 may further include, for example, a power source/monitor 380 (e.g., inside the flight deck), one or more controllers 382, and one or more drivers 384 in communication with and configured to receive information from the data acquisition system 378. The controller 382 may be configured to receive information, such as information representative of the leading-edge slat being deployed (i.e., moving to the extended position) from the data acquisition system 378 and/or the flight deck. In response, the controller 382 may send a command to the one or more drivers 384 to send power the heating source 374 to heat the shape-memory material.

In some embodiments, in operation, when the leading-edge slat 226 is moved to the retracted position, the noise-suppressing projection 254 engages the surface portion 364, which includes the shape memory material, to deform the surface portion 364 from the second to the first position and allow the noise-suppressing projection 254 to be received in the projection receiving portion 362. When the leading-edge slat 226 is moved to the extended position, a system associated with the aircraft recognizes that the leading-edge slat 226 is being deployed and activates a heating circuit configured to heat the shape memory material of the surface portion 364 above the transition temperature such that the surface portion 364 moves from the first position to the second position.

As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

As used herein, language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112 (f). However, for any claims containing elements designated in any other manner, it is intended that such elements are not to be interpreted under 35 U.S.C. § 112 (f).

While the invention has been described with reference to the exemplary examples thereof, those skilled in the art will be able to make various modifications to the described examples without departing from the true spirit and scope. The terms and descriptions used herein are set forth by way of illustration only and are not meant as limitations. Although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A projection receiving arrangement for an aircraft wing, comprising:

a projection receiving portion located in an upper side of a leading-edge portion of the aircraft wing, wherein the projection receiving portion is configured to receive a noise-suppressing projection positioned on a cove surface of a leading-edge slat of the aircraft wing when the leading-edge slat is in a retracted position;

a surface portion that is configured to move between a first position in which the surface portion at least partially defines the projection receiving portion and a second position in which the surface portion moves to provide a convex or planar surface in place of the projection receiving portion; and wherein the surface portion is configured to move to the first position when the leading-edge slat is in a retracted position and is configured to move to the second position when the leading-edge slat is in an extended position.

2. The projection receiving arrangement of claim 1, wherein the surface portion is configured to pivot between the first position and the second position.

3. The projection receiving arrangement of claim 2, further comprising a hinge portion configured to pivotally attach the surface portion to the leading-edge portion aft of the projection receiving portion.

4. The projection receiving arrangement of claim 2, further comprising a biasing portion configured to bias the surface portion to the second position.

5. The projection receiving arrangement of claim 1, wherein the surface portion includes a shape-memory alloy trained to move the surface portion from the first position to the second position in response to being heated above a transition temperature.

6. The projection receiving portion of claim 5, wherein the surface portion is configured to morph from a concave shape in the first position to the convex or planar surface in the second position.

7. The projection receiving arrangement of claim 1, wherein the noise-suppressing projection is a fixed hump.

8. The projection receiving arrangement of claim 1, wherein the surface portion is configured to be moved to the first position by the noise-suppressing projection when the leading-edge slat is moved to the retracted position.

9. An aircraft wing assembly, comprising:

a fixed wing portion;

a leading-edge slat attached to the fixed wing portion and configured to move between a retracted position and an extended position, wherein the leading-edge slat includes a noise-suppressing projection on a cove surface;

a projection receiving portion located in an upper side of a leading-edge portion of the fixed wing portion, the projection receiving portion configured to receive the noise-suppressing projection when the leading-edge slat is in the retracted position;

a surface portion configured to move between a first position in which the surface portion at least partially defines the projection receiving portion and a second position in which the surface portion moves to provide a convex or planar surface in place of the projection receiving portion; and wherein the surface portion is configured to move to the first position when the leading-edge slat is in a retracted position and is configured to move to the second position when the leading-edge slat is in an extended position.

10. The aircraft wing assembly of claim 9, wherein the surface portion is configured to pivot between the first position and the second position.

11. The aircraft wing assembly of claim 10, further comprising a hinge portion configured to pivotally attach the surface portion to the leading-edge portion aft of the projection receiving portion, and a biasing portion configured to bias the surface portion to the second position.

12. The aircraft wing assembly of claim 9, wherein the surface portion includes a shape-memory alloy trained to move the surface portion from the first position to the second position in response to being heated above a transition temperature.

13. The aircraft wing assembly of claim 12, wherein the surface portion is configured to morph from a concave shape in the first position to the convex or planar surface in the second position.

14. The aircraft wing assembly of claim 9, wherein the noise-suppressing projection is a fixed hump.

15. The aircraft wing assembly of claim 9, wherein the surface portion is configured to be moved to the first position by the noise-suppressing projection when the leading-edge slat is moved to the retracted position.

16. A method for implementing an aircraft wing configured to reduce aerodynamic noise generated by leading-edge slats during high-lift operations, comprising:

providing a fixed, noise-suppressing projection on a cove surface of a leading-edge slat of an aircraft wing, wherein the noise-suppressing projection is configured to reduce noise associated with airflow when the leading-edge slat is in an extended position;

receiving the fixed, noise-suppressing projection in a projection receiving portion on an upper side of the aircraft wing when the leading-edge slat is in a retracted position; and moving a surface portion to a first position, in response to the leading-edge slat moving to the retracted position to allow the noise-suppressing projection to be received in the projection receiving portion; and moving the surface portion to a second position to provide a convex or planar surface in place of the projection receiving portion.

17. The method of claim 16, wherein receiving the fixed, noise-suppressing projection in the projection receiving portion further comprises engaging the surface portion with the noise-suppressing projection to move the surface portion to the first position.

18. The method of claim 17, wherein the surface portion is configured to pivot inward relative to an upper surface of a leading-edge portion of the aircraft wing to move to the first position.

19. The method of claim 18, further comprising biasing the surface portion to the second position.

20. The method of claim 16, wherein the surface portion includes a shape-memory alloy trained to expand from the second position, and moving the surface portion to the second position comprises heating the surface portion above a transition temperature.

* * * * *